US008641026B2

(12) United States Patent
Sever

(10) Patent No.: US 8,641,026 B2
(45) Date of Patent: Feb. 4, 2014

(54) FUEL NOZZLE SERVICING TOOL

(75) Inventor: John Sever, Pacific, MO (US)

(73) Assignee: Husky Corporation, Pacific, MO (US)

( * ) Notice: Subject to any disclaimer, the term of this patent is extended or adjusted under 35 U.S.C. 154(b) by 272 days.

(21) Appl. No.: 12/924,736

(22) Filed: Oct. 4, 2010

(65) Prior Publication Data

US 2011/0084432 A1 Apr. 14, 2011

Related U.S. Application Data

(60) Provisional application No. 61/278,532, filed on Oct. 8, 2009.

(51) Int. Cl.
*B23Q 1/00* (2006.01)
*B23Q 3/00* (2006.01)
*B25B 1/20* (2006.01)

(52) U.S. Cl.
USPC ............... 269/54.5; 269/16; 269/900; 269/43

(58) Field of Classification Search
USPC ........ 269/54.5, 16, 900, 43, 289 R, 249, 143; 141/350; 29/281.1, 257; D14/235
See application file for complete search history.

(56) References Cited

U.S. PATENT DOCUMENTS

| | | | | |
|---|---|---|---|---|
| D337,716 | S | 7/1993 | Weissman | |
| 5,402,939 | A | 4/1995 | Shank, Jr. | |
| 5,697,071 | A * | 12/1997 | Fan | 455/575.9 |
| 2009/0273130 | A1* | 11/2009 | Armstrong et al. | 269/16 |

* cited by examiner

*Primary Examiner* — Lee D Wilson
*Assistant Examiner* — Seahee Yoon
(74) *Attorney, Agent, or Firm* — Paul M. Denk

(57) ABSTRACT

A tool for servicing a fuel dispensing nozzle, said tool comprising a substantially semicircular base plate with two uprights protruding from the top to receive a fuel pump nozzle therein; said base plate being formed to fit on the mouth of a bucket and substantially cover the mouth of said bucket, while leaving open a portion of the bucket; said base plate having on its bottom surface protruding guides to ensure a snug fit on the mouth of said bucket; so that a fuel dispensing nozzle may be easily secured for separation from a hose and residual fuel may be easily drained from said nozzle and said hose.

15 Claims, 4 Drawing Sheets

FUEL NOZZLE SERVICING TOOL

CROSS REFERENCE TO RELATED APPLICATION

This non provisional patent application claims priority to the provisional patent application having Ser. No. 61/278,532, having filing date Oct. 8, 2009.

BACKGROUND OF THE INVENTION

The maintenance and servicing of fuel dispensing nozzles presents several unique challenges. In most cases, the initial step in servicing a fuel nozzle is detachment of the nozzle from the hose. This detachment requires the technician to use a tool to apply torsion to the coupling member of the nozzle. The shape of the nozzle can make this task difficult, especially if loosening the coupling member requires a great deal of force. The nozzle tends to move and slip in the technician's hand. Further problems arise when the nozzle has been detached from the hose. Residual fuel present in the nozzle and the hose inevitably spills out, creating an inconvenience and a safety hazard.

SUMMARY OF THE INVENTION

The present invention provides a tool for securing a fuel nozzle during service and maintenance. In the preferred embodiment, the tool comprises a substantially semicircular base plate with two rigid vertical uprights extending substantially perpendicularly from the base plate. The dimensions of the base plate are such as will allow it to fit snugly over the mouth of a standard pail or bucket. The bottom of the base plate features at least two protruding guides that contact the interior of a bucket and hold the tool snugly in place across the top of the bucket, leaving open a portion of the bucket mouth.

The uprights, which are substantially rectangular, are fashioned so that each has one end flush with the outer edge of the base plate. The distance between the uprights gradually narrows from one end to the other, creating a tapered gap between said uprights, said gap being widest at the front edge of the base plate. The tool can thus accommodate a variety of nozzle sizes and shapes.

The tool is used by placing a fuel dispensing nozzle upside down between the uprights and sliding the nozzle until it is snugly situated between the uprights. When the nozzle is placed in the tool, the spout of the nozzle extends upward beyond the edge of the tool, and the butt of the nozzle remains over the open portion of the bucket. The tool facilitates detachment of the hose from the nozzle by resisting the torsion created by the uncoupling process. The open portion of the bucket provides space for turning an adjustable wrench or other tool used to detach the hose. The individual servicing the nozzle may grasp the uprights of the servicing tool with one hand while using the other hand to rotate the hose coupling member. When the nozzle is detached from the hose, the residual fuel in the nozzle and the hose may be drained directly into the container.

In the preferred embodiment, the base plate, uprights, gussets, and guides are integrally formed in a single piece of molded plastic. In another embodiment, the uprights and/or guides can be easily separated from the base plate to facilitate storage of the tool. When the tool is needed for use, the uprights and/or guides may be attached to the base plate by inserting integrally formed tabs in the uprights and/or guides into patterned slots in the base plate.

It is the object of this invention to provide a tool for securely holding a fuel dispensing nozzle during maintenance and servicing. It is a further object of this invention to provide a tool that allows the individual servicing of a fuel dispensing nozzle to minimize contact with residual fuel. This invention also facilitates collection and disposal of residual fuel by fitting snugly on the top of a standard bucket, leaving an opening for draining fuel into the container.

Variations or modifications to the subject matter of this invention may occur to those skilled in the art upon review of the summary of the invention as provided herein. Other objects and purposes for this invention may also be considered by those having expertise in this field.

BRIEF DESCRIPTION OF THE DRAWINGS

In referring to the drawings, which illustrate the preferred embodiment of the invention.

FIG. 6 shows a relatively narrower nozzle. As can be seen, the nozzle in FIG. 6 is situated more rearward than the nozzle in FIG. 5. This demonstrates the utility of the curved uprights;

DESCRIPTION OF THE PREFERRED EMBODIMENT

Figure 1:
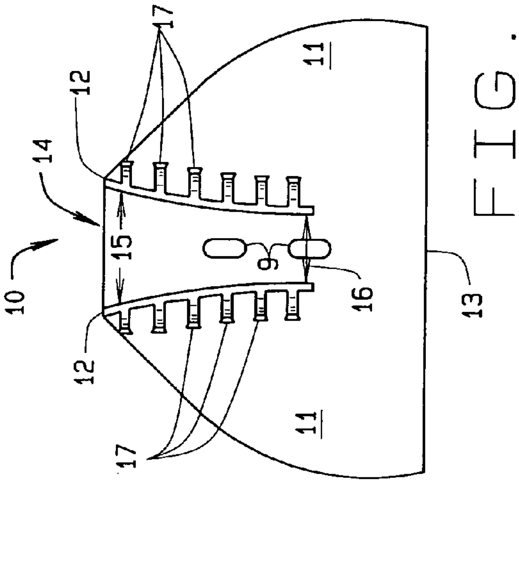
FIG. 1 is a top plan view of the nozzle servicing tool. This view illustrates the shape of the preferred embodiment and shows the gussets supporting the uprights. The curvature of the uprights and the tapered gap between the uprights can be clearly seen.

Referring to FIG. 1, there is shown a top view of nozzle servicing tool 10, with base plate 11 and uprights 12. The shape of the base plate 11 is substantially semicircular, so as to substantially cover the mouth of a pail, container or bucket, while leaving open a portion of the bucket mouth. The longest straight edge 13 of the base plate is the back edge of the tool, and the opposite edge 14 is the front edge. A pair of vertical uprights 12 extends from front edge 14 substantially across the base plate toward the back edge 13, said uprights being substantially perpendicular to the base plate 11. The uprights are mirror images of one another. The uprights are curved so that the gap between them is tapered, with the widest part 15 of the gap being at the front edge of the servicing tool, and the narrowest part 16 of the gap being at the end of the uprights nearest the back edge of the tool. The uprights are reinforced by gussets 17. There are apertures 9 provided through the said base plate to accommodate drainage of any residue fuel.

Figure 2:
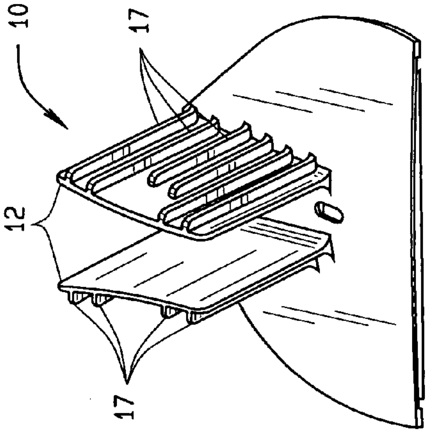
FIG. 2 is a perspective view of the servicing tool, further revealing the inner face of one of the uprights and the gusseted back of the other upright.

FIG. 2 shows a perspective view of servicing tool 10. This view clearly shows the gussets 17 supporting uprights 12.

Figure 3:
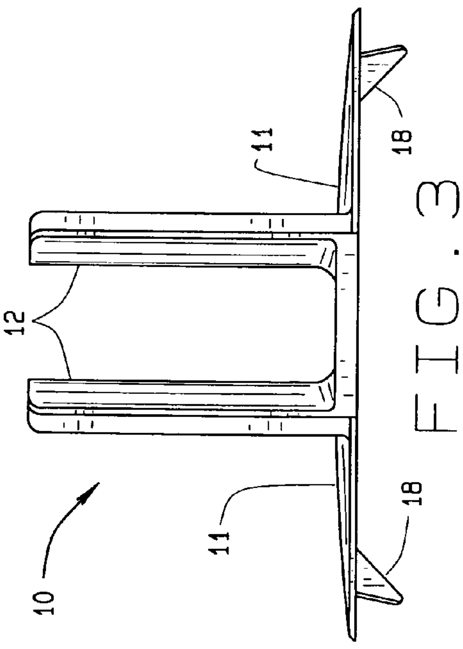
FIG. 3 is a front view of the tool. The triangular guides can be seen protruding from the bottom of the tool.

FIG. 3 shows a front elevation view of servicing tool 10 with uprights 12 extending vertically from base plate 11. Two guides 18 can be seen protruding from the bottom of base plate 12. The purpose of the guides is to contact the interior of the bucket, thereby facilitating the servicing tool's snug fit over the bucket mouth.

Figure 4:
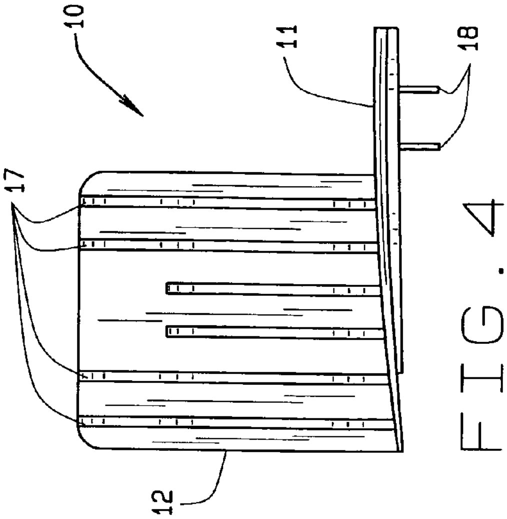
FIG. 4 is a side view of the tool, showing the gusseted upright protruding from the top surface and the guides protruding from the bottom surface.

FIG. 4 is a side elevation of servicing tool 10 with base plate 11 and upright 12, said upright supported by gussets 17. Guides 18 can be seen protruding from base plate 11.

Figure 5:
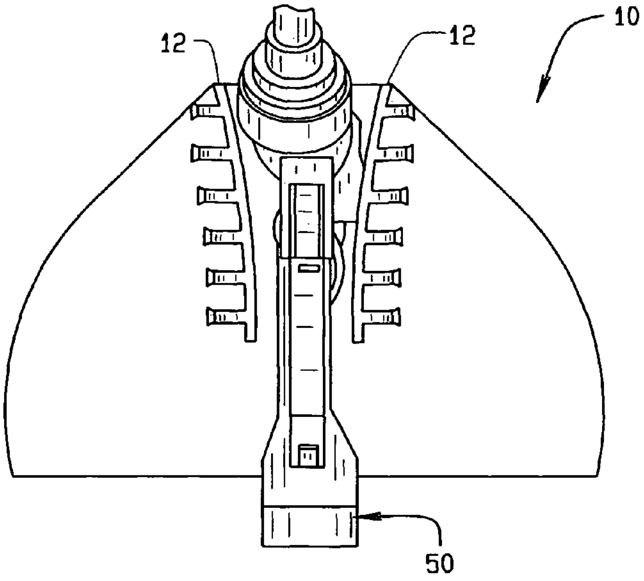
FIG. 5 is a top view of the tool in use with a nozzle inserted between the uprights.
Figure 6:
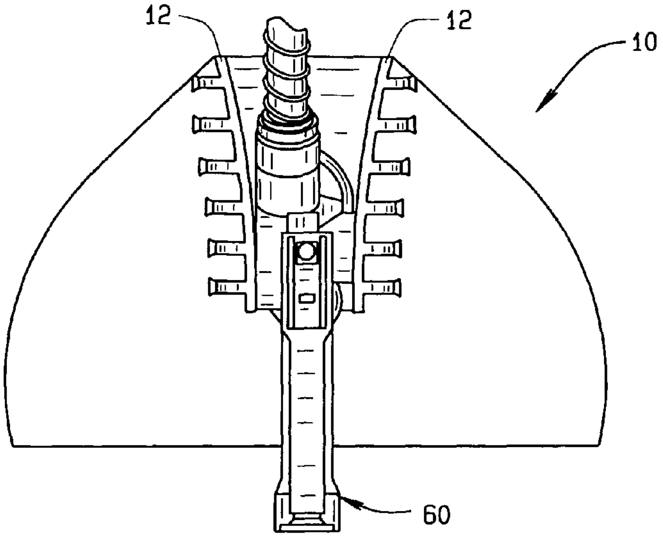
FIG. 6 is another top view of the tool in use. As compared with FIG. 5.

FIGS. 5 and 6 show the servicing tool 10 in use, illustrating the utility of the tapered gap between the uprights 12. In FIG. 5, the servicing tool is shown in use with fuel pump nozzle 50 inserted between the uprights 12. As can be seen, the nozzle 50 has been situated between uprights 12 so that it fits snugly between the uprights at its widest point. In FIG. 6, the same servicing tool 10 is shown in use with a relatively smaller nozzle 60 inserted between uprights 12. As can be seen, the narrower width of nozzle 60 can be accommodated by situating the nozzle further toward the back of the servicing tool. An equally snug fit is therefore ensured for each nozzle, despite their differing dimensions. In each figure, the coupling member of the nozzle extends beyond the back of the nozzle servicing tool, thereby facilitating drainage of residual fuel remaining in the nozzle.

Figure 7:
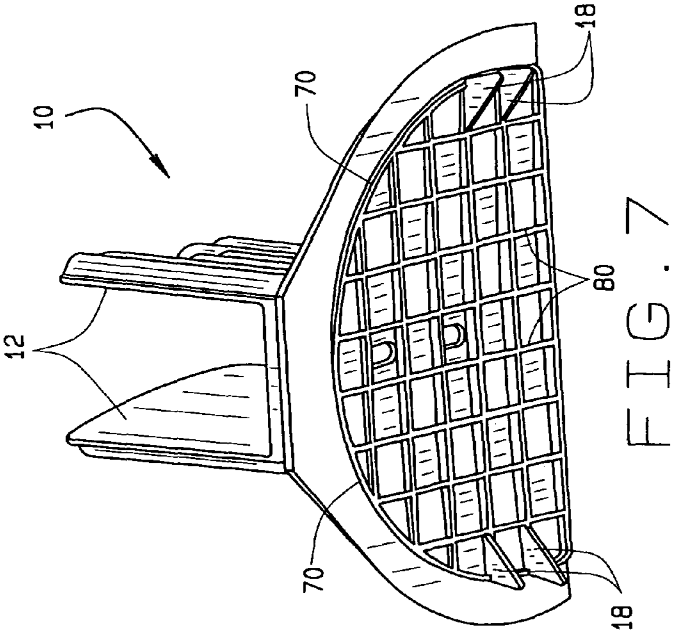
FIG. 7 shows a bottom perspective view of the servicing tool, with the guides clearly visible.

FIG. 7 is a bottom perspective view of the preferred embodiment of the servicing tool 10. A substantially semicircular ridge 70 can be seen on the bottom of the base plate. The dimensions of the ridge are precisely formed to allow the ridge to operate as a flange to hold the servicing tool in place when the tool is placed on the mouth of a bucket. The ridge 70 fits snugly against the circumference of the inside of the bucket rim. As can be seen, the guides 18 are arranged on opposite sides of the bottom of the base plate, forming mirror images with their complements on the opposite side. A series of reinforcements, as at 80, strengthen the base plate.

Figure 8:
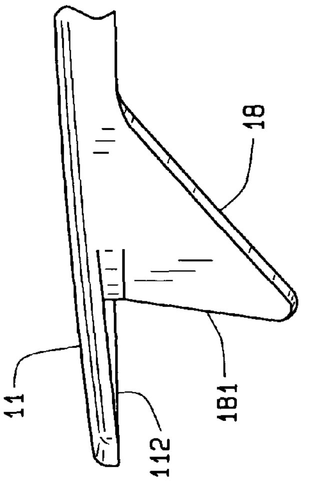
FIG. 8 shows a detail of one of the elbows of the servicing tool.
Figure 9:
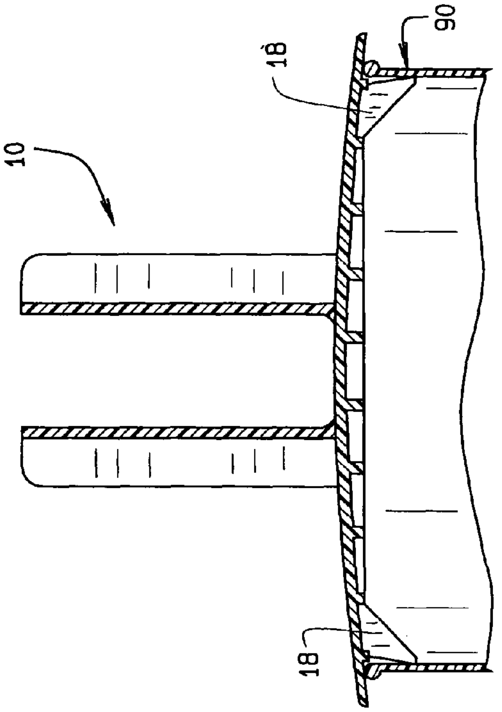
FIG. 9 shows the servicing tool deployed within a bucket, illustrating the function of the elbows on the bottom side of the tool.

FIGS. 8 and 9 illustrate the utility of the guides protruding from the bottom of the servicing tool base plate. FIG. 8 is a detail of a guide 18 protruding from the bottom surface of base plate 11. As can be seen and understood, the outer edge 181 of guide 18 extends laterally, forming an acute angle with the bottom surface 112 of base plate 11. The distance between the lateral extremes of complementary guides is therefore slightly greater than the inner, diameter of the bucket. As a result, insertion of the servicing tool into a bucket requires slight flexion of the base plate, thereby taking advantage of the elasticity of the tool material to hold the tool snugly in place on the rim of the bucket. FIG. 9 shows a servicing tool 10 deployed within a bucket 90, with guides 18 shown pressing against the inner surface of the bucket.

Figure 10:
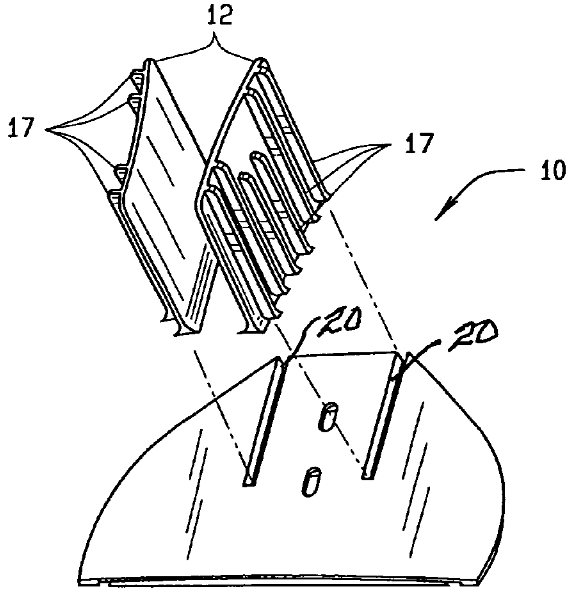
FIG. 10 shows that the uprights are removable from their base plate.

FIG. 10 shows that the guides 12 are removable from their base plate 11 with a first and second slots as shown below the guides 12.

Figure 11:
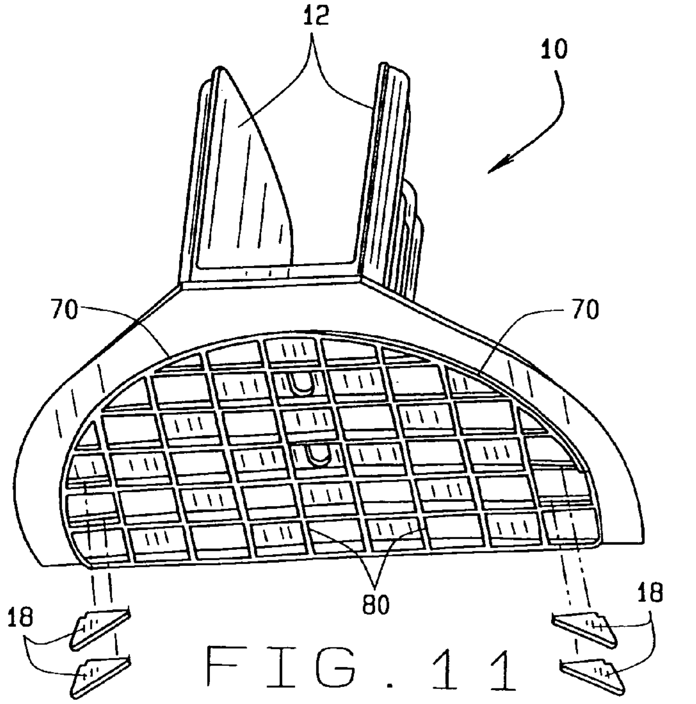
FIG. 11 shows that the guides are removable from their base plate.

And, FIG. 11 shows that the guides 18 are removable from their base plate.

Further variations and modifications to the subject matter of this invention may occur to those skilled in the art. Such variations, within the scope of this invention, are intended to be encompassed within the confines of the claims as set forth herein. The illustrations for this invention, its description, and its depiction in the drawings, are set forth for illustrative purposes only.

I claim:

1. A combination of a tool and a fuel dispensing nozzle connected to a hose for dispensing fuel, said tool being used in combination with a bucket having a mouth, said combination of the tool and the fuel dispensing nozzle comprising (a) a substantially semicircular base plate with a top surface, a bottom surface, a back edge, and a front edge, said base plate being precisely formed to substantially cover the mouth of the bucket, leaving open a portion of the bucket mouth;

(b) a fuel dispensing nozzle;

(c) two uprights protruding from said top surface of said base plate, said uprights extending inward from the front edge of said base plate, with the vertical orientation of said uprights being substantially perpendicular to the top surface of said base plate, said uprights being mirror images of each other, said uprights being spaced apart to form a tapered gap therebetween for placement of the fuel dispensing nozzle with the widest part of said gap at the front edge of said base plate and the narrowest part of the gap at the opposite end of said uprights, wherein the tapering of the uprights provides for wedging of the fuel dispensing nozzle therein during servicing of the fuel dispensing nozzle; and d) at least two guides protruding from said bottom surface of said base plate, said guides being situated and arranged on opposite sides of said bottom surface of said base plate, such that upon application of the base plate onto the bucket, the guides insert into the mouth of the bucket and provide for a snug fit of the servicing tool in the mouth of said bucket during usage.

2. The combination of a tool and a fuel dispensing nozzle of claim 1, wherein said uprights are detachable from said base plate.

3. The combination of a tool and a fuel dispensing nozzle of claim 1, wherein said guides are detachable from said base plate.

4. The combination of a tool and a fuel dispensing nozzle of claim 1 wherein said base plate includes at least one aperture to provide for drainage of residual fuel therethrough and into the bucket.

5. The combination of a tool and a fuel dispensing nozzle of claim 1 wherein said uprights have a series of gussets integral thereto to furnish reinforcement to the uprights during usage of the said tool.

6. The combination of a tool and a fuel dispensing nozzle of claim 1 wherein said base plate has a series of reinforcements provided along its bottom surface to add strength to the base plate during usage.

7. The tool for servicing a fuel dispenser nozzle of claim 1, wherein said guides are situated in complementary pairs arrange on opposite sides of the bottom surface of said base plate, such that upon insertion into a bucket said guides provide for a snug fit of the servicing tool in the mouth of the bucket.

8. A tool for servicing a fuel dispensing nozzle connected to a hose for dispensing fuel, said tool being used in combination with a bucket having a mouth, said tool comprising:

a base plate having a top surface, a bottom surface, a back edge, a front edge, and a first slot and a second slot formed in the base plate with each of the slots extending from the front edge toward the back edge, the base plate for covering a portion of the mouth of the bucket for leaving open a portion of the mouth of the bucket;

a first upright for being inserted into the first slot and protruding from the top surface of the base plate;

a second upright for being inserted into the second slot and protruding from the top surface of the base plate with the first upright and the second upright being spaced apart to form a tapered gap therebetween for placement of the fuel dispensing nozzle in the tapered gap;

a pair of guides protruding from the bottom surface of the base plate, the guides being positioned on opposite sides of the bottom surface of the base plate, with the guides for being inserted into the mouth of the bucket to provide for a snug fit of the servicing tool in the mouth of the bucket during usage.

9. The tool for servicing a fuel dispensing nozzle of claim 8 wherein the tapered gap has a wide portion and a narrow portion with the wide portion being at the front edge.

10. The tool for servicing a fuel dispensing nozzle of claim 8 wherein the first upright further comprises a front face and a back face and a series of gussets on the back face.

11. The tool for servicing a fuel dispensing nozzle of claim 8 wherein the second upright further comprises a front face and a back face and a series of gussets on the back face.

12. The tool for servicing a fuel dispensing nozzle of claim 8 wherein the base plate further comprises an aperture formed therein to allow any fuel to be drained into the bucket.

13. The tool for servicing a fuel dispensing nozzle of claim 8 wherein the bottom surface comprising a series of reinforcements.

14. The tool for servicing a fuel dispensing nozzle of claim 8 wherein the pair of guides are detachable from the bottom surface of the base plate.

15. The tool for servicing a fuel dispensing nozzle of claim 8 further comprising a second pair of guides protruding from the bottom surface of the base plate, the second pair of guides being positioned on opposite sides of the bottom surface of the base plate, with the second pair of guides for being inserted into the mouth of the bucket to provide for a snug fit of the servicing tool in the mouth of the bucket during usage.

* * * * *